United States Patent [19]
Guigan

[11] 3,942,627
[45] Mar. 9, 1976

[54] LOAD CONVEYOR

[76] Inventor: Jean Guigan, 9 rue Jean Mermoz, 75008 Paris, France

[22] Filed: Nov. 29, 1974

[21] Appl. No.: 528,567

[30] Foreign Application Priority Data
Dec. 13, 1973 France ............................ 73.44557

[52] U.S. Cl. ..................... 198/219; 180/8 R; 198/1
[51] Int. Cl.² ......................................... B65G 25/04
[58] Field of Search ...... 198/218, 219, 1; 214/1 BE; 180/8 R, 8 C, 8 E, 7 R; 280/DIG. 7

[56] References Cited
UNITED STATES PATENTS

| | | | |
|---|---|---|---|
| 3,034,591 | 5/1962 | Bell | 180/8 E |
| 3,221,870 | 12/1965 | Pagay | 198/219 |
| 3,327,832 | 6/1967 | Kyle | 198/1 |
| 3,537,540 | 11/1970 | Zuppiger | 180/8 C |
| 3,693,740 | 9/1972 | Lewis | 180/8 R |

Primary Examiner—Evon C. Blunk
Assistant Examiner—James L. Rowland
Attorney, Agent, or Firm—Haseltine, Lake & Waters

[57] ABSTRACT

Load conveyor comprising a pneumatic mat comprising first elements and second elements which are inflatable respectively by a first and second inflating circuit, the elements having fixed ends in relation to a face of the mat and free ends capable of being brought, by means of the inflating circuits, by a pivoting movement, from a rest position to a work position, the elements having a same parity always being parallel to one another and situated on a same side in relation to their fixed ends, the projections of the first elements being parallel to the projections of the second elements, but pointing in opposite directions.

8 Claims, 11 Drawing Figures

LOAD CONVEYOR

The invention relates to the handling of unit loads and concerns more particularly a conveyor in the form of a mat.

The aim of the invention is to produce a load conveyor which is not very expensive, easy to use, capable, for example, of loading or unloading a wagon or truck, much more rapidly than the means used up till now, of the handling carriage or conveyor belt type.

The present invention has for its object a load conveyor, characterized, more particularly in that it comprises a pneumatic mat, comprising first elements and second elements which are inflatable, respectively, by means of a first and second inflating circuit; all the elements have ends which are fixed in relation to one face of the mat and free ends capable of being brought by a pivoting movement from a rest position to a work position; the elements having the same parity are always parallel to each other and situated on a same side in relation to their fixed ends, the orthogonal projections of the first elements on the face being parallel to those of the second, but pointing in opposite directions. The line of direction common to the projections of all the elements in the direction of propagation of the loads on the mat. The two inflating circuits are implemented so that the load to be moved be borne successively by the first elements, the second elements, again the first elements and so on.

According to a variant of embodiment which is particularly easy to produce, the first elements are alined according to the said direction of propagation and constitute a first file adjacent to a second file formed by a similar alinement of the said second elements.

In order that all the free ends of the elements having the same parity undergo simultaneous pivoting movements, it is an advantage to connect them by a rigid link, for example, a band or a cable.

By way of an example of embodiment, a file is formed by a flexible tube surrounded by parallel rings inclined on the axis of that tube, the assembly resting on a band provided with fixing points for the said rings, the said points constituting the said fixed ends.

A conveyor according to the invention may, to great advantage, have several mats respectively constituted by first and second elements and several belts orthogonal to the preceding ones, also constituted respectively by first and second elements.

Other particularities and advantages of the invention will become apparent from the following description, which will be given with reference to the accompanying drawing, given by way of illustration but having no limiting character and in which.

Figure 1A:
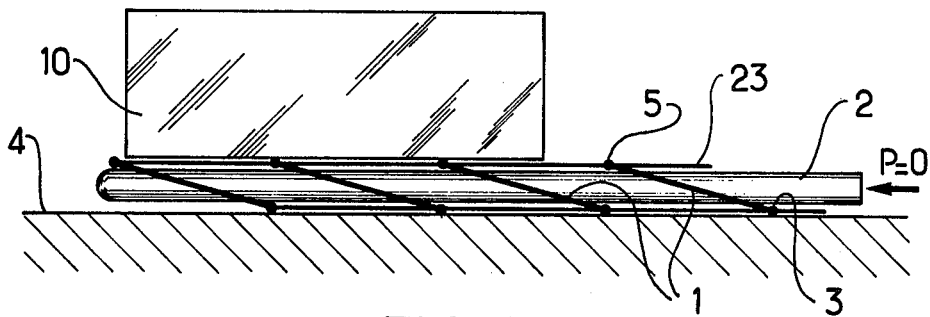
FIGS. 1a and 1b illustrate very diagrammatically, in a partial longitudinal cross-section view, respectively in the rest position and in the work position, a portion of a pneumatic mat according to the invention.

FIG. 1a illustrates partly in the rest position a longitudinal band of a pneumatic mat according to the invention, intended for transporting a unit load 10 which may be arranged on a pallet. The mat comprises several square rings 1, arranged parallel to one another round a flattened flexible tube 2, connected to a first pneumatic circuit which is not illustrated. The rings 1 are fixed rigidly at points 3 to a lower band 4 constituting the face of the mat opposite to the carrying face for the load.

Figure 1B:
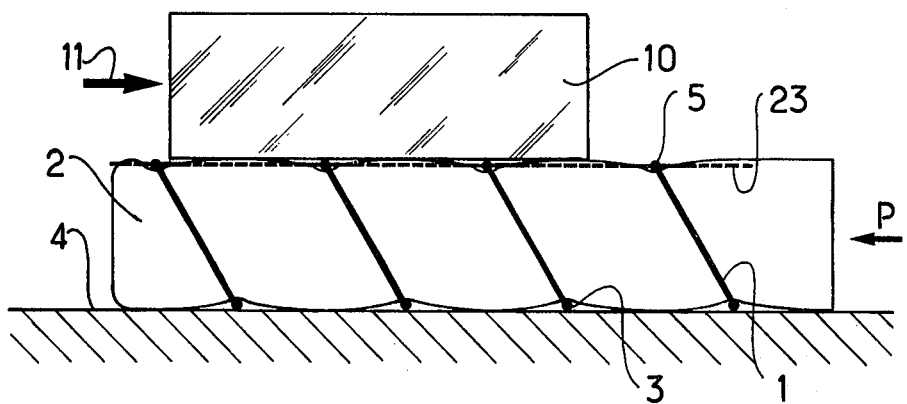

At the level of that carrying face, the rings 1 have free ends 5 capable, as shown in FIG. 1b, of pivoting about fixing points 3 under the effect of a pressure P applied in the flexible tube 2. The fixing of the rings 1 on the band 4 is such that the plane of the rings never pivots beyond a plane perpendicular to the plane of the band 4. The pivoting movement of the rings is such that they always remain parallel to one another and that they drive the load 10 in a linear movement diagrammatically represented by the arrow 11. The free ends 5 of the rings 1 are, to great advantage, connected by a link 23, for example a cable or a band, making it possible to encourage the simultaneousness of the pivoting movements.

Figure 1C:
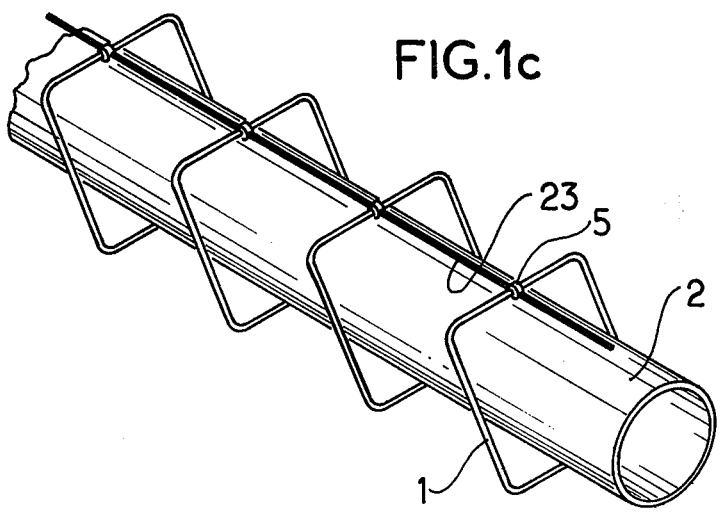
FIG. 1c is a perspective view corresponding to figure 1b.

FIG. 1c shows more clearly the arrangement of the rings in the working position.

It should be observed that the rings may be of any shape, for example, circular and that the rings may even be integrated in the wall of the tube 2 or be inside that wall, as in the case of FIGS. 2a, 2b, 2c, 2d, 2e, 2f.

Figure 2A:
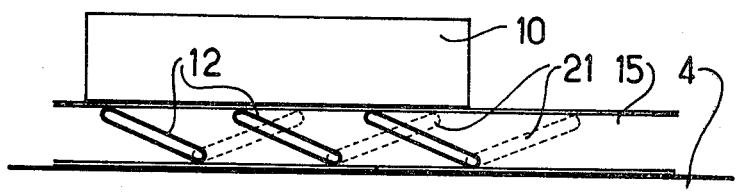
FIGS. 2a, 2b, 2c, 2d, 2e, 2f illustrate very diagrammatically the different phases of an operation cycle of a conveyor according to the invention.

In FIG. 2a, a conveyor according to the invention comprises at least two series of rings. Thus, the first series of rings 12 connected with a flexible tube 15 connected to a first inflating circuit, not shown, has been shown in thick lines, and a second series of rings 21 connected with a flexible tube 22 connected to a second inflating circuit, not shown, has been diagrammatically shown in discontinuous lines. The two series of rings are arranged parallel to each other under the load 10; the planes of the rings having the same parity are always parallel to one another and the orthogonal projections of the rings 12 on the band 4 are parallel to those of the rings 21, but facing in opposite directions. Like the rings 12, the rings 21 are capable of being driven in a pivoting movement generated by the applying of a pressure in the tube which is connected with them.

FIGS. 2b, 2c, 2d, 2e and 2f illustrate the principle of the variations in pressures in the flexible tubes 15 and 22, in order to enable a progression of the load 10 in the direction 11.

Figure 2B:
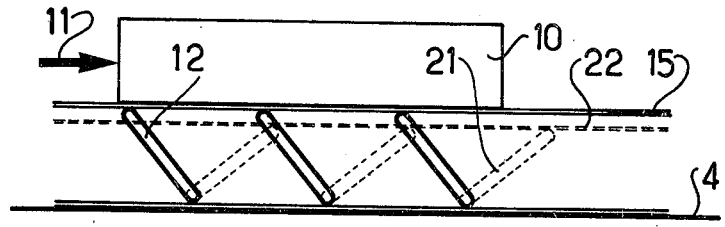
Figure 2C:
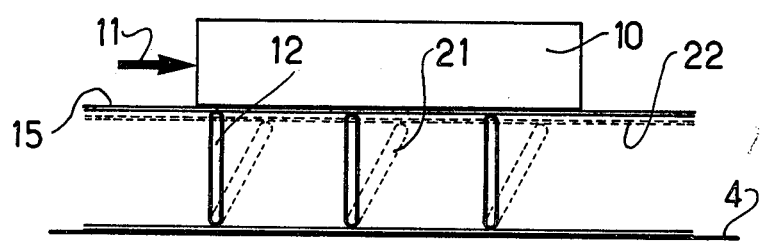
Figure 2D:
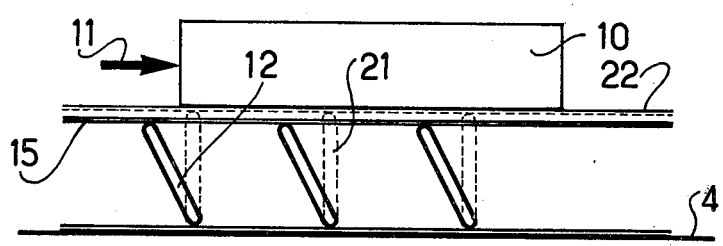
Figure 2E:
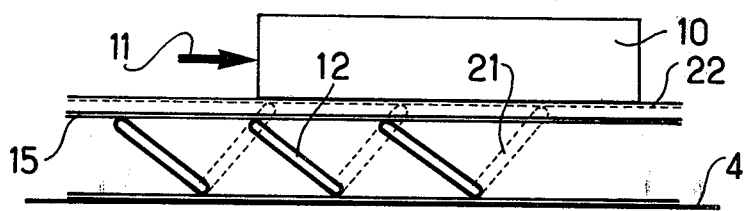
Figure 2F:
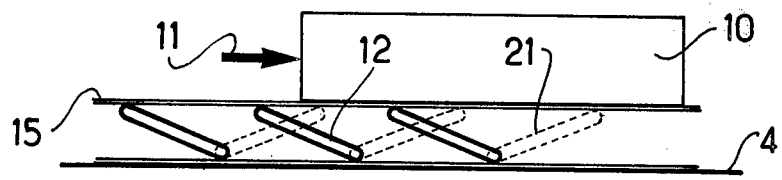

P1 will subsequently be observed as the value of the pressure in the tube 15 and P2 will subsequently be observed as the value of the pressure in the tube 22. FIG. 2a shows the rest state where P1 and P2 are nil. In FIG. 2b, P1 and P2 increase, P1 increasing faster than P2; the load 10 is then lifted only by the rings 12 and undergoes a linear movement in the direction of the arrow 11. As shown in FIG. 2c, P1 is maximum and the rings 12 always support the load 10. In the following phase, illustrated by FIG. 2d, P1 decreases and P2 becomes maximum; the load 10 is no longer supported by the series of rings 12, but by the series of rings 21. Then, as shown in FIG. 2e, the pressures P1 and P2 decrease in the two tubes 15 and 22 and the pivoting movement from top to bottom of the rings 21 makes the load 10 progress again in the direction of the arrow 11. FIG. 2f shows the new rest position of the conveyor corresponding to the two zero pressures P1 and P2. The comparison between FIGS. 2a and 2f brings out clearly the linear progression of the load 10. The system is then ready for another operation cycle.

It must be understood that the principle illustrated in FIGS. 2 may be brought into effect by means of the variant of embodiment illustrated by the FIGS. 1, but also by means of any other equivalent variant; thus, the use of a pneumatic belt provided with a face comprising pockets one of whose ends is fixed and one of whose free ends is capable of being driven by inflating in a pivoting movement about the fixed end may be provided for. Such mats are made of resilient materials chosen from among natural rubbers and synthetic rubbers.

Figure 3:
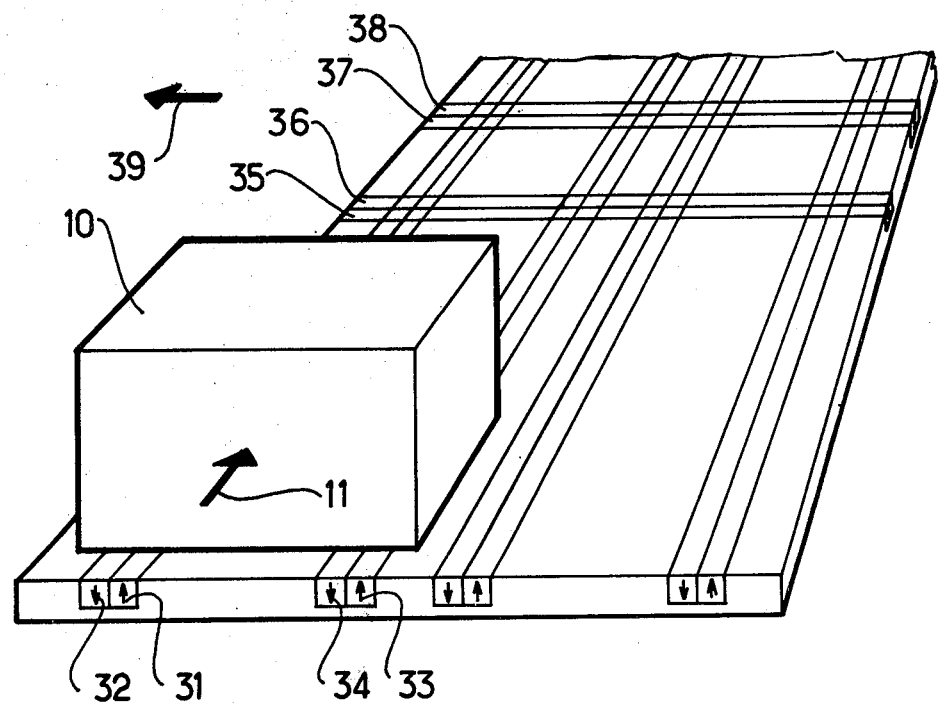
FIG. 3 illustrates diagrammatically a perspective view of a variant of embodiment of a conveyor according to the invention.

As shown in FIG. 3, a conveyor according to the invention, intended for transporting a load 10 having great dimensions, may comprise several belts of the preceding type, arranged parallel to one another; thus, a linear movement 11 is obtained by means of two series of parallel bands 31, 32 and 33, 34, the controls of the related inflating circuits being synchronized. A linear movement 39 orthogonal to the linear movement 11 may be obtained by means of two series of bands 35, 36 and 37, 38, perpendicular to the bands 31, 32 and 33, 34.

Figure 4:
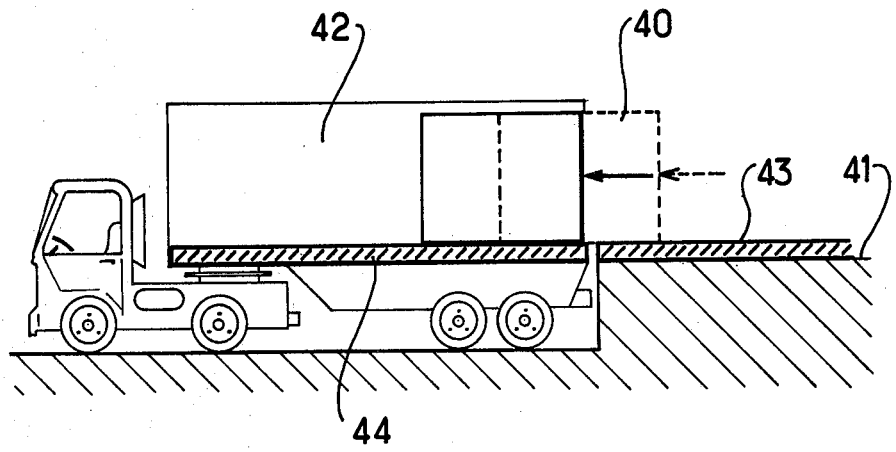
FIG. 4 illustrates diagrammatically an application of a conveyor according to the invention to the loading of a lorry from a platform.

A conveyor according to the invention requires, for example, pressures in the order of a few kg/squ.cm. to transport the loads ordinarily stocked in wagons or trucks. As shown in FIG. 4, a mat 43 has been implemented with a view to loading in a truck 42 with a load 40 arranged on a platform 41, a mat 43 on the platform 41 and a mat 44 on the bottom of the truck 42 facing the mat 43. The pneumatic circuits related respectively to the mats 43 and 44 are controlled in phase so as to enable the easy passing in a few minutes of the load 40 from the platform 41 right to the bottom of the truck 42. A similar system makes it possible to unload easily the same load 40 from the same truck 42 onto another platform, into another wagon or into any other storage building.

A conveyor according to the invention makes it possible to avoid the use of handling carriages, while providing unloading which is simple and much more rapid.

All the above describes a mat in which the carrying face comprised free ends capable of pivoting movements. It must be understood that the carrier face may be the opposite face, the mat itself then moving on the ground, the load remaining fixed in relation to it.

The invention is not limited to the applications nor to the embodiments described and illustrated. It would be possible, without going beyond the scope of the invention, to replace certain means by equivalent means.

I claim:

1. A load conveyor comprising a mat including first and second juxtaposed inflatable elements, said elements each having an upper supporting surface for a load and a lower surface resting on the mat, a plurality of members longitudinally spaced along each said element and having first ends attached to said mat along the lower surface of said element, said members having second movable ends opposite the first ends operatively associated with the respective element to undergo pivotal movement as the associated element is inflated and deflated, said members of each element being parallel to one another and initially inclined with the vertical when the associated element is deflated and undergoing tilting towards the vertical during inflation of said element to transport a load on said upper surface in the direction of tilting, said members of the two elements being inclined in opposite directions and undergoing opposite directions of tilting when their respective elements are inflated such that one element transports the load in one direction during inflation and the other element transports the load in the same direction during deflation.

2. A conveyor as claimed in claim 1 wherein the lower surface of each element is attached to said mat, and said member are attached to said mat by being attached to its respective element at the lower surface thereof.

3. A conveyor as claimed in claim 1 comprising rigid link means connecting the movable second ends of the members of each element.

4. A conveyor as claimed in claim 1 wherein said inflatable elements are tubes and said members are rings disposed around said tubes.

5. A conveyor as claimed in claim 4 wherein said rings are externally disposed on said tubes and the lower ends of the rings are attached to said mat.

6. A conveyor as claimed in claim 4 wherein said rings are internally disposed in said tubes.

7. A conveyor as claimed in claim 4 wherein said rings are of square shape.

8. A conveyor as claimed in claim 1 wherein said mat is made from a resilient substance.

* * * * *